March 2, 1926.
A. K. HINCHMAN
POWER ACTUATED WINDSHIELD WIPER
Original Filed May 7, 1920
1,575,163
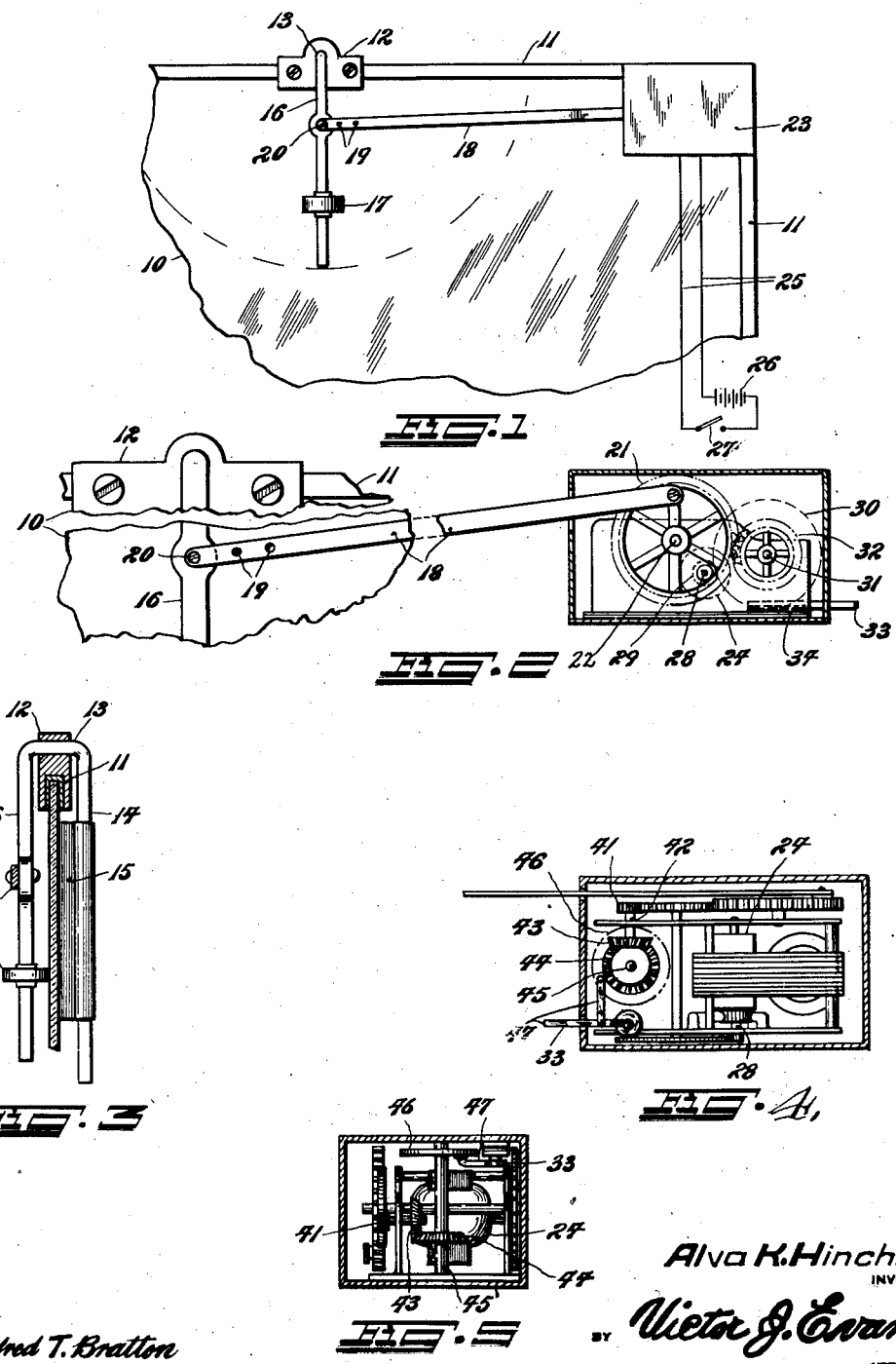

Patented Mar. 2, 1926.

1,575,163

UNITED STATES PATENT OFFICE.

ALVA K. HINCHMAN, OF PHILADELPHIA, PENNSYLVANIA.

POWER-ACTUATED WINDSHIELD WIPER.

Application filed May 7, 1920, Serial No. 379,590. Renewed August 1, 1925.

*To all whom it may concern:*

Be it known that I, ALVA K. HINCHMAN, a citizen of the United States, residing at Philadelphia, in the county of Philadelphia and State of Pennsylvania, have invented new and useful Improvements in Power-Actuated Windshield Wipers, of which the following is a specification.

The invention relates to devices for cleaning or wiping window glass and similar smooth surfaces and is particularly adapted for use in connection with the wind shields of automobiles and similar motor vehicles for wiping the surfaces thereof, to remove any accumulations of moisture, dust or dirt.

The invention comprehends among other features the provision of a means for electrically or otherwise actuating a wind shield wiper attached to the wind shield or the frame thereof to remove therefrom any accumulation of moisture, dust or dirt as in the nature of the action of a squeegee.

In the further disclosure of the invention, reference is to be had to the accompanying drawings constituting a part of this specification, in which similar characters of reference denote corresponding parts in all the views, and in which,—

Figure 1—is a fragmentary elevation of a wind shield showing my device applied thereto, parts being broken away to disclose the underlying structure, with the electric wiring and contact button being shown diagrammatically.

Figure 2—is an elevation of the motor, the casing being broken away to disclose the underlying structure, showing the manner of connecting the crank rod with the wiper.

Figure 3—is a vertical transverse sectional view taken through the wind shield, showing the manner of wiping the wind shield.

Figure 4—is a plan view of a slightly modified form of mechanism showing an automatic reverse, and Figure 5—is an end elevation of the same.

Referring more particularly to the views the numeral 10 indicates a wind shield carried by a suitable frame 11 on the upper edge of which is clamped a bearing 12 having a shaft 13 mounted to swing thereon. The shaft 13 has a portion or arm 14 provided with a squeegee 15 adapted to operate over the outer surface of the wind shield and for this purpose the portion 14 is bent adjacent its point of mounting in the bearing 12 to extend downwardly over the outer surface of the wind shield. The inner portion or arm 16 of the shaft is also bent downwardly adjacent the inner surface of the wind shield and preferably carries a roller 17 to facilitate the operation of the wiper. The outer end of a crank rod 18 has pivotal connection with the portion or arm 16 of the wiper and in order that a desired adjustment can be secured, the crank rod 18 is provided with a plurality of openings 19 with a pin 20 passing through one of the openings and through the arm 16. The inner end of the crank rod is pivoted eccentrically on a toothed wheel 21 journaled on a stud 22 enclosed in a casing 23 and constituting a part of the actuating mechanism, the casing being preferably located adjacent one corner of the wind shield. An electric motor 24 is carried in the casing 23 and suitable electric wires 25 connect with the motor and with a battery 26 and an operating button or switch 27. The motor has its armature shaft 28 provided with a pinion 29 meshing with a toothed wheel 30 carried on a cross shaft 31 journaled on the frame 22, and the other end of the shaft 31 carries a toothed wheel 32 meshing with the toothed wheel 21. A reversing lever 33 is mounted on the frame of the motor and through a commutator 34 brings about a reversal of the current through the armature of the motor when the lever is actuated, in order that the motor can be reversed in its operation.

From the foregoing it will be seen that when the electric circuit is closed by reason of operation of the button or switch 27, the motor will be placed in operation and through the train of gears described, will bring about rotation of the toothed wheel 21 and operation of the crank rod 18, thus swinging the wiper across the outer face of the wind shield.

In the modified form shown in Figures 4, 5, I provide the motor 24 with additional gears and in this instance a toothed wheel 41, is carried on a shaft 42 journaled on the motor frame and which also carries a beveled toothed wheel 43 meshing with a horizontally disposed beveled toothed wheel 44, the latter being carried on a vertical shaft 45 journaled on the motor frame and the upper end of which carries a horizontally disposed disk 46. The disk 46 has eccentrically pivoted thereon, one end of a link or crank rod 47, the other end of which has pivotal connection with the reversing lever 33.

With this form of construction it will be seen that when the motor is actuated by the closing of the electric circuit thereof, each time that the wiper shown in Figures 1, 3, swings to substantially 180°, the train of gears 32, 41, 43 and 44, by their association bringing about rotation of the disk 46, will actuate the reversing lever to reverse the passage of the current through the armature of the motor and thus reverse the operation of the motor, the wiper in this instance being subjected to an oscillating action.

Having described my invention, I claim—

1. In a windshield cleaning device for vehicles, an attaching bracket adapted to be attached to a windshield and provided with a driving shaft and gearing, a rock shaft on said windshield spaced from said bracket and provided with a crank arm on the inner side thereof, a connecting link between said crank arm and gearing, and an arm mounted on said rock shaft and provided with a windshield cleaning element on the outside of said windshield and adapted to be reciprocated by said crank arm through the movements of said rock shaft and actuating gearing.

2. A windshield wiper comprising a rock shaft on said windshield, a crank arm on the inner end of said shaft and an arm mounted on the outer end of said shaft and carrying a wiper element for swinging contact with the glass, a power driven shaft mounted in spaced relation from the rock shaft, a crank arm actuated by the power driven shaft, and a link connecting the crank arms, the link being adjustable as to length, and the crank arm carried by the rock shaft being longer than the crank arm actuated by the power driven shaft.

In testimony whereof I affix my signature.

ALVA K. HINCHMAN.